Figure 1:
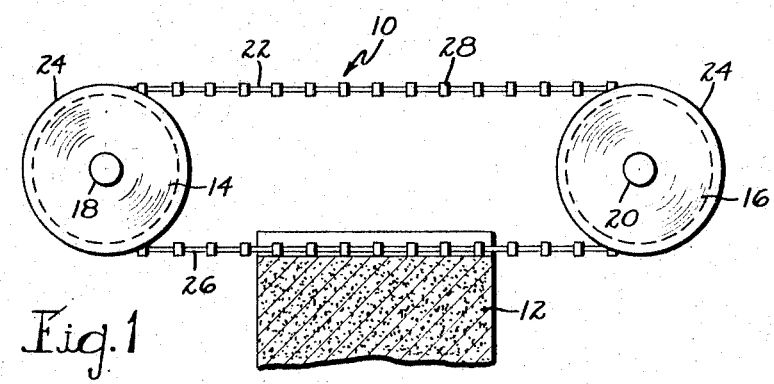

Jan. 10, 1967  H. A. SNOW  3,297,014

CABLE-TYPE STONE CUTTING SAW

Filed May 13, 1964

INVENTOR.
Henry A. Snow
BY
Norman S. Blodgett
Attorney 3,297,014
CABLE-TYPE STONE CUTTING SAW
Henry A. Snow, Shrewsbury, Mass., assignor to Snow Diamond Products, Inc., Marlboro, N.H., a corporation of New Hampshire
Filed May 13, 1964, Ser. No. 367,152
2 Claims. (Cl. 125—21)

This invention relates to cutting apparatus and, more particularly, to an improved construction for cable-type stone cutting saw.

Cable-type stone cutting saws have been known for some time and have proved generally successful. However, widespread use of this type of apparatus has been inhibited to a great extent by a combination of factors, one of which is the high initial cost of manufacturing the individual cutting elements. More particularly, according to the present practice, individual disc-like abrasive members are axially positioned on an endless wire or cable and held in spaced relationship thereon by means of intermediate spacers such as spring members. Each abrasive member is comprised of a central metal core having an outer shell of abrasive material formed thereon. The cost of manufacturing the individual abrasive members combined with the involved and expensive method of assembling them in spaced relationship on the central wire or cable has contributed markedly to the aforementioned high unit cost.

Moreover, it has been found that under continuous use, the cutting elements experience rapid wear, in turn, resulting in the need to replace them at relatively frequent intervals. Thus, it can be seen that the combination of high unit cost and relatively short useful life has prevented the industry from fully taking advantage of this type of cutting apparatus. These and other disabilities of the prior art devices are obviated in a novel manner by the present invention.

It is, therefore, an outstanding object of this invention to produce an improved cable-type stone cutting element having a greatly simplified and less costly construction.

Another object of the invention is the provision of individual disc-like abrasive wheels having a unitized, integrally-fabricated construction.

A still further object of the present invention is the provision of disc-like abrasive wheels integrally fabricated of a diamond bonded material.

Another object of the present invention is the provision of a greatly simplified and inexpensive means of positioning the individual disc-like abrasive wheels on a wire or cable.

A still further object of the present invention is simplification of the construction of cable-type stone cutting elements in order to render their use inexpensive enough to be practical.

With these and other objects in view, as will be apparent to those skilled in the art, the invention resides in the combination of parts set forth in the specification and covered by the claims appended hereto.

Figure 2:
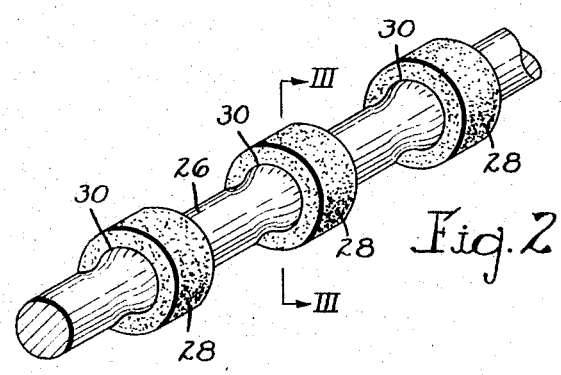
Figure 3:
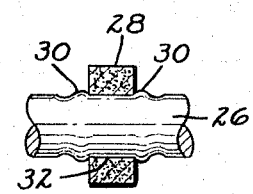
Figure 4:
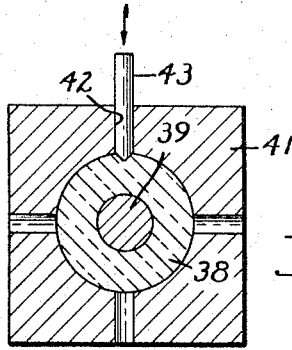

The character of the invention, however, may best be understood by reference to certain of its structural forms, as illustrated by the accompanying drawings in which:

FIG. 1 is a general view in side elevation of a cable-type cutting saw constructed in accordance with the teachings of the present invention, FIG. 2 is an enlarged perspective view of a portion of the cutting element, FIG. 3 is a sectional view taken along the line III—III of FIG. 2, showing the means for attaching each individual abrasive element to the central wire or cable, and FIG. 4 shows a modification of the invention.

Referring first to FIG. 1, wherein are best shown the general features of the invention, a cable-type cutting saw, generally indicated by the reference numeral 10, is shown positioned adjacent a stone block 12. The saw is comprised basically of two spaced-apart pulleys 14 and 16 mounted on shafts 18 and 20 with an endless cutting element 22 extending therebetween. The cutting element extends around the far side of each pulley and is seated within circumferential grooves 24. In operation, either shaft 18 or 20 may be driven by any conventional means as, for example, by an electric motor (not shown) to impart motion to the cutting element 22.

It should, of course, be understood that the basic elements of the saw 10 as herein illustrated may be utilized in portable models or in heavy duty industrial models where the stones to be cut are transported to the cutting site.

The cutting element 22 is comprised of an endless central wire or cable 26 having mounted thereon at spaced intervals abrasive cutting elements herein shown in the form of small diameter discs or wheels indicated typically by the reference numeral 28. As can be better seen in FIGS. 2 and 3, each abrasive wheel 28 is axially mounted on a wire 26 of appropriate tensile strength and held thereon in spaced relationship by means of small retaining shoulders 30 formed in the wire at either side of each wheel.

In practice, the wire 26 is initially threaded through a plurality of abrasive wheels 28 and the ends of the wire thereafter permanently joined. Each individual wheel is then axially displaced to the desired position. The central passageway 32 extending through each wheel is provided with an inner diameter only slightly larger than the outer diameter of the wire in order to permit a relatively tight sliding relationship therebetween. Once a particular wheel is in place, the wire 26 is slightly deformed or swaged at either side in order to produce the aforementioned retaining shoulders 30. The extent of the swaging and the diameter and tensile strength of the wire are carefully interrelated in order to avoid harmful weakening of the cutting element. This procedure is followed until each individual wheel is positioned on the wire and the fabrication of the cutting element 22 completed. In this manner, the need for expensive spacer elements is avoided and the construction cost of each cutting element correspondingly reduced.

It should also be noted that each abrasive disc or wheel 28 is comprised of an integrally-fabricated, unitized structure of diamond bonded material. This simplified structure contributes markedly to the aforementioned advantageous low-cost construction of the present apparatus.

FIG. 4 shows a modification of the invention in which the wheel is locked to the wire in a slightly different manner. After the diamond-bonded wheel 38 has been placed on the wire 39, it is inserted in an anvil 41. This anvil is provided with at least one radial passage 42 into which is inserted a swaging tool 43. The tool is struck sharply, causing the inner end to penetrate the soft, malleable bond of the wheel. The wheel is deformed and, therefore, is locked to the wire.

By decreasing the initial cost of each cutting element through the use of the aforementioned improved construction, practical and widespread use of cable-type cutting saws is rendered practical. More particularly, once a cutting element is worn down due to continuous use, it may simply be discarded without loss of any considerable investment. Therefore, by decreasing replacement costs, a significant advantage is gained and a serious industrial problem obviated.

It is obvious that minor changes may be made in the form and construction of the invention wtihout departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An improved saw of the type utilized in cutting stone comprising a combination of an elongated flexible cable, a plurality of small diameter abrasive wheels on said cable, said wheels provided with centrally extending passageways substantially the diameter of said cable to provide a tight threading of said cable therethrough, the outside diameter of said wheels corresponding to the desired width of the cut to be made in said stone, each of said wheels having throughout a unitized malleable bond integrally fabricated with a diamond abrasive substance, means for maintaining each of said abrasive wheels in fixed, non-rotatable spaced relationship on said cable, said means comprising slightly raised portions of said cable to form shoulders on said cable at either side of each said wheels, said shoulders having outside diameters larger than the inside diameters of said centrally extending passageways, the extremities of said cable joined to form an endless cutting element, and means for continuously driving said cutting element in one direction.

2. An improved saw of the type utilized in cutting stone, comprising the combination of an elongated flexible cable, a plurality of small diameter abrasive wheels on said cable, said wheels provided with centrally-extending passageways substantially the diameter of said cable to provide tight threading of said cable therethrough, the outside diameter of said wheels corresponding to the desired width of the cut to be made in said stone, each of said wheels having throughout a unitized malleable bond integrally fabricated with a diamond abrasive substance, means for maintaining each of said abrasive wheels in fixed, non-rotatable, spaced relationship on said cable, said means comprising a deformation of the wheel and the cable to lock the wheel in place on the cable, the extremities of said cable being joined to form an endless cutting element.

References Cited by the Examiner

UNITED STATES PATENTS

| | | | |
|---|---|---|---|
| 2,599,920 | 6/1952 | Jakobsson | 125—21 |
| 2,679,839 | 6/1954 | Metzger | 125—21 |

FOREIGN PATENTS

| | | |
|---|---|---|
| 72,179 | 10/1959 | France. |
| 1,265,542 | 5/1961 | France. |
| 759,505 | 10/1956 | Great Britain. |

HAROLD D. WHITEHEAD, *Primary Examiner.*